US011018830B2

(12) United States Patent
Hu et al.

(10) Patent No.: US 11,018,830 B2
(45) Date of Patent: May 25, 2021

(54) REFERENCE SIGNAL TRANSMISSION METHOD AND APPARATUS

(71) Applicant: HUAWEI TECHNOLOGIES CO., LTD., Guangdong (CN)

(72) Inventors: Yuanzhou Hu, Shanghai (CN); Mengying Ding, Shanghai (CN); Pengpeng Dong, Shanghai (CN); Zongjie Wang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/505,298

(22) Filed: Jul. 8, 2019

(65) Prior Publication Data

US 2019/0342052 A1 Nov. 7, 2019

Related U.S. Application Data

(63) Continuation of application No. PCT/CN2018/071613, filed on Jan. 5, 2018.

(30) Foreign Application Priority Data

Jan. 9, 2017 (CN) .......................... 201710014590.7
Feb. 6, 2017 (CN) .......................... 201710067326.X

(51) Int. Cl.
*H04L 5/00* (2006.01)
*H04J 13/00* (2011.01)
(Continued)

(52) U.S. Cl.
CPC ........ *H04L 5/0051* (2013.01); *H04J 13/0062* (2013.01); *H04L 1/0038* (2013.01); *H04L 27/2614* (2013.01); *H04W 72/0453* (2013.01)

(58) Field of Classification Search
None
See application file for complete search history.

(56) References Cited

U.S. PATENT DOCUMENTS 9,137,076 B2    9/2015 Luo et al.
2008/0232486 A1 9/2008 Kowalski
(Continued)

FOREIGN PATENT DOCUMENTS

CN    101741793 A    6/2010
CN    103209485 A    7/2013
(Continued)

OTHER PUBLICATIONS

Huawei et al., "UL DMRS design for data transmission",3GPP TSG RAN WG1 Meeting #NR R1-16xxxxx,Spokane, USA, Jan. 16-20, 2017,total 6 pages.

(Continued)

*Primary Examiner* — Anh Vu H Ly
(74) *Attorney, Agent, or Firm* — Womble Bond Dickinson (US) LLP

(57) ABSTRACT

This application proposes a reference signal transmission method and a device. The method includes: converting, by a sending device, a frequency domain reference signal from frequency domain to time domain, to generate a time domain reference signal, where the frequency domain reference signal includes a reference signal sequence mapped to a frequency domain resource group, the reference signal sequence is related to a Zadoff-Chu sequence and a length of the reference signal sequence, and a length value of the Zadoff-Chu sequence is greater than a quantity of minimum time-frequency resource units included in a maximum frequency domain resource that can be allocated; and sending, by the sending device, the time domain reference signal. According to the reference signal transmission method in this application, a performance requirement on a PAPR/

(Continued)

RCM of a reference signal can be met, a quantity of blind reference signal detection times can be reduced, and system performance can be improved.

17 Claims, 7 Drawing Sheets

(51) Int. Cl.
*H04L 1/00* (2006.01)
*H04L 27/26* (2006.01)
*H04W 72/04* (2009.01)

(56) References Cited

U.S. PATENT DOCUMENTS

| | | | | |
|---|---|---|---|---|
| 2009/0116587 A1* | 5/2009 | Kwasinski | .......... | H04L 27/2613 375/340 |
| 2010/0195637 A1* | 8/2010 | Iwai | .......... | H04J 13/105 370/343 |
| 2010/0284265 A1* | 11/2010 | Ogawa | .......... | H04J 13/22 370/208 |
| 2010/0285755 A1* | 11/2010 | Iwai | .......... | H04J 13/0062 455/68 |
| 2011/0075760 A1* | 3/2011 | Ogawa | .......... | H04J 1/02 375/296 |
| 2013/0114514 A1 | 5/2013 | Nissila et al. | | |
| 2014/0177427 A1 | 6/2014 | Yiu et al. | | |
| 2014/0355710 A1* | 12/2014 | Takata | .......... | H04B 7/0452 375/267 |
| 2015/0365977 A1* | 12/2015 | Tabet | .......... | H05K 999/99 370/330 |
| 2016/0157196 A1* | 6/2016 | Xia | .......... | H04W 56/001 370/336 |
| 2017/0164350 A1* | 6/2017 | Sun | .......... | H04L 5/0007 |
| 2018/0091249 A1* | 3/2018 | Han | .......... | H04L 5/0094 |
| 2018/0184390 A1* | 6/2018 | Wu | .......... | H04W 56/0005 |
| 2018/0241603 A1* | 8/2018 | Jia | .......... | H04L 25/03834 |
| 2018/0270801 A1 | 9/2018 | Novlan et al. | | |
| 2018/0367277 A1* | 12/2018 | Zhang | .......... | H04L 27/2602 |
| 2019/0327053 A1* | 10/2019 | Hu | .......... | H04L 5/0005 |
| 2020/0021414 A1* | 1/2020 | Ding | .......... | H04L 27/0008 |
| 2020/0067621 A1* | 2/2020 | Hu | .......... | H04L 5/0048 |

FOREIGN PATENT DOCUMENTS

| | | |
|---|---|---|
| CN | 103973392 A | 8/2014 |
| CN | 104054384 A | 9/2014 |
| CN | 105191178 A | 12/2015 |
| EP | 2178231 A1 | 4/2010 |

OTHER PUBLICATIONS

Qualcomm Incorporated, "Views on UL DMRS design",3GPP TSG-RAN WG1 #87 R1-1612050, Nov. 14-18, 2016,Reno, USA,total 4 pages.

3rd Generation Partnership Project,Technical Specification Group Radio Access Network;Evolved Universal Terrestrial Radio Access (E-UTRA);Physical Channels and Modulation(Release 8), total 83 pages.

* cited by examiner

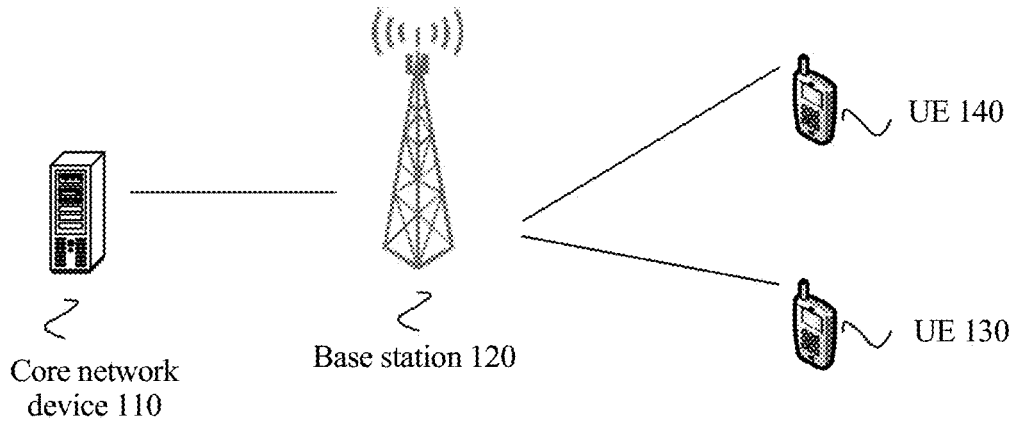

FIG. 1

S210. Determine a reference signal sequence based on a ZC sequence and a length of the reference signal sequence, where a length value of the ZC sequence is greater than a quantity of minimum time-frequency resource units included in a maximum frequency domain resource that can be allocated S220. Map the reference signal sequence to a frequency domain resource group, to generate a frequency domain reference signal

FIG. 2

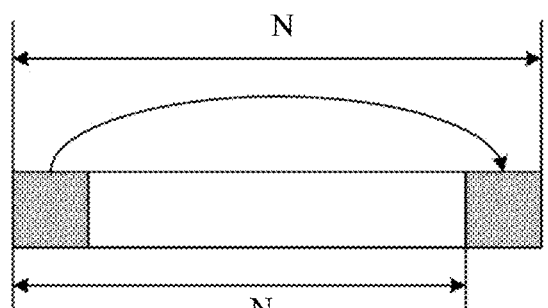
(a) Cyclic extension
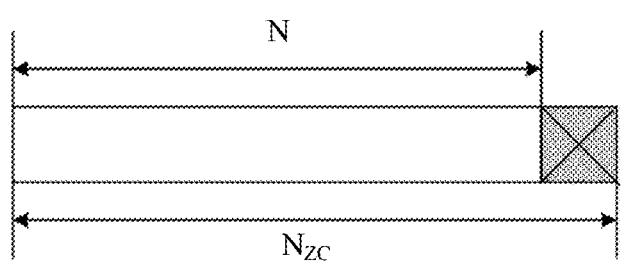
(b) Truncation
FIG. 3

S610. A sending device converts a frequency domain reference signal from frequency domain to time domain, to generate a time domain reference signal, where the frequency domain reference signal includes a reference signal sequence mapped to a frequency domain resource group, and the reference signal sequence is determined based on a Zadoff-Chu sequence and a length of the reference signal sequence S620. The sending device sends the time domain reference signal

FIG. 6

S710. A receiving device receives a time domain reference signal

S720. The receiving device converts the time domain reference signal from time domain to frequency domain, to generate a frequency domain reference signal, where the frequency domain reference signal includes a reference signal sequence mapped to a frequency domain resource group, and the reference signal sequence is determined based on a ZC sequence and a length of the reference signal sequence

FIG. 7

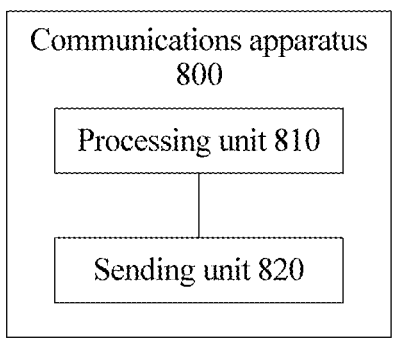

FIG. 8

REFERENCE SIGNAL TRANSMISSION METHOD AND APPARATUS

CROSS-REFERENCE TO RELATED APPLICATIONS

This application is a continuation of International Application No. PCT/CN2018/071613, filed on Jan. 5, 2018, which claims priority to Chinese Patent Application No. 201710014590.7, filed on Jan. 9, 2017 and Chinese Patent Application No. 201710067326.X, filed on Feb. 6, 2017. The disclosures of the aforementioned applications are hereby incorporated by reference in their entireties.

TECHNICAL FIELD

Embodiments of the present invention relate to the communications field, and in particular, to a reference signal transmission method and an apparatus in a wireless communications system.

BACKGROUND

In a wireless communications system, a reference signal (Reference Signal, RS) is also referred to as a pilot signal, and is a predefined signal sent by a sending device to a receiving device on a predefined resource. The receiving device may obtain channel-related information based on the received reference signal, and complete channel estimation or channel measurement. A channel measurement result may be used for resource scheduling and link adaptation, and a channel estimation result may be used by the receiving device to demodulate data. Generally, to obtain accurate channel-related information, different reference signals need to be orthogonal. A plurality of reference signals that are orthogonal to each other are usually provided in a time division mode, a frequency division mode, a code division mode, or the like. In a long term evolution (long term evolution, LTE) system, uplink reference signals include an uplink demodulation reference signal (demodulation reference signal, DMRS) and an uplink sounding reference signal (sounding reference signal, SRS), and downlink reference signals include a cell-specific reference signal (cell-specific reference signal, CRS), a downlink DMRS, a channel state information-reference signal (channel state information-reference signal, CSI-RS), a multimedia broadcast multicast service single frequency network reference signal (multimedia broadcast multicast service single frequency network reference signal, MBSFN RS), and a positioning reference signal (positioning reference signal, PRS). The reference signal, especially, the uplink reference signal, requires a low peak-to-average power ratio (peak-to-average power ratio, PAPR) and a low raw cubic metric (raw cubic metric, RCM), to avoid a case in which demodulation performance is reduced because distortion of a reference signal that passes through a power amplifier (power amplifier, PA) is worse than that of data that passes through the power amplifier. Therefore, a Zadoff-Chu (Zadoff-Chu, ZC) sequence is used as an uplink reference signal sequence in the LTE system, so that the uplink reference signal is characterized by a low PAPR/RCM.

In an application scenario of a dynamic time division duplex (time division duplex, TDD) subframe structure, uplink and downlink subframe configurations may be different in neighboring cells. For example, a current subframe is configured as an uplink subframe in a cell C1, but the current subframe may be configured as a downlink subframe in a neighboring cell C2. In this case, if cell edge user equipment U1 in the cell C1 sends uplink data, downlink receiving of cell edge user equipment U2 in the cell C2 is seriously interfered with. The user equipment U2 may blindly detect a reference signal of the U1, to cancel interference from the reference signal of the U1. If a possible maximum assigned bandwidth is 110 resource blocks (resource block, RB), and there are 35 different bandwidth assignment manners, an interfering reference signal can be determined only after blind detection is performed for many times, and consequently blind detection overheads are very high.

SUMMARY

This application provides a reference signal generation method, a reference signal transmission method, and a device, so that a performance requirement on a PAPR/RCM of a reference signal can be met, a quantity of blind reference signal detection times can be reduced, and system performance can be improved.

According to a first aspect, a frequency domain reference signal generation method is provided, and includes: determining a reference signal sequence based on a ZC sequence and a length of the reference signal sequence, where a length value of the ZC sequence is greater than a quantity of minimum time-frequency resource units included in a maximum frequency domain resource that can be allocated; and mapping the reference signal sequence to a frequency domain resource group, to generate a frequency domain reference signal.

The reference signal generated in the method is characterized by a low PAPR/RCM, and a ZC sequence that needs to be used when blind detection is performed on the reference signal is unrelated to a resource allocation size of the reference signal. Therefore, a quantity of blind detection times can be reduced, so as to reduce blind detection overheads. The reference signal may be generated in a module of a sending device, or may be generated in a module of a receiving device.

In one embodiment, the reference signal sequence is further determined based on a location of the frequency domain resource group in the maximum frequency domain resource that can be allocated. The reference signal sequence generated in this embodiment is a sequence that is completely corresponding to the location of the frequency domain resource group and that is captured from the ZC sequence, so that when blind detection is performed on the reference signal, there is no need to use various possible locations of the frequency domain resource group, and a quantity of blind detection times can be further reduced, thereby reducing blind detection overheads, and improving system performance.

In one embodiment, the reference signal sequence is further determined based on a spacing between two adjacent minimum time-frequency resource units in the frequency domain resource group. In this embodiment, the reference signal generation method is also applied to a scenario in which minimum time-frequency resource units in the frequency domain resource group are distributed in a comb shape.

In one embodiment, the Zadoff-Chu sequence is $X_q(m)$, and $X_q(m)$ is determined according to $$X_q(m) = e^{-j\frac{\pi \cdot q \cdot m \cdot (m+1)}{N_{zc}}},$$

where j represents an imaginary unit, m represents a sequence number of an element in the Zadoff-Chu sequence, m is an integer and $0 \leq m \leq N_{zc}-1$, $N_{zc}$ represents the length value of the Zadoff-Chu sequence, q represents a root value of the ZC sequence, and q and $N_{zc}$ are mutually prime.

In one embodiment, the length $N_{zc}$ of the Zadoff-Chu sequence is 21157, and the root value q of the Zadoff-Chu sequence is one of the following: 1149, 1203, 1215, 1345, 1827, 1873, 1962, 2040, 2276, 2927, 2931, 3196, 3201, 3223, 3406, 3787, 5596, 6247, 6276, 6426, 7736, 7749, 7768, 8693, 8767, 8779, 8970, 9216, 9983, 9996, 11161, 11174, 11941, 12187, 12378, 12390, 12464, 13389, 13408, 13421, 14731, 14881, 14910, 15561, 17370, 17751, 17934, 17956, 17961, 18226, 18230, 18881, 19117, 19195, 19284, 19330, 19812, 19942, 19954, and 20008.

In one embodiment, the length $N_{zc}$ of the Zadoff-Chu sequence is 131969, the root value q of the Zadoff-Chu sequence is one of the following: 2908, 5919, 8108, 9176, 11359, 12842, 13721, 18287, 19123, 21435, 22441, 25895, 27039, 30666, 36263, 38169, 40822, 42738, 44949, 51705, 54664, 59740, 61399, 67366, 68376, 70570, 78403, 82997, 86400, and 95108, and a bandwidth of the frequency domain resource group is greater than or equal to three RBs.

In one embodiment, the length $N_{zc}$ of the Zadoff-Chu sequence is 479971, and the root value q of the Zadoff-Chu sequence is one of the following: 24335, 35852, 49443, 65019, 76272, 88558, 102028, 126841, 139505, 150710, 169872, 181751, 197023, 210577, 222328, 253191, 264402, 276530, 296245, 307534, 329261, 340466, 352513, 368238, 387393, 402362, 413569, 424829, 437224, and 448552.

In one embodiment, the length $N_{zc}$ of the Zadoff-Chu sequence is 119993, and the root value q of the Zadoff-Chu sequence is one of the following: 2197, 3470, 4396, 6191, 7683, 9025, 10362, 11745, 13755, 14512, 17680, 18691, 20638, 23545, 24419, 25507, 30658, 37305, 40689, 52894, 58095, 67099, 71288, 79123, 82688, 89335, 108248, 110302, 112310, and 116074.

According to a second aspect, a reference signal transmission method is provided, and includes: converting, by a sending device, a frequency domain reference signal from frequency domain to time domain, to generate a time domain reference signal, where the frequency domain reference signal includes a reference signal sequence mapped to a frequency domain resource group, the reference signal sequence is determined based on a Zadoff-Chu sequence and a length of the reference signal sequence, and a length value of the Zadoff-Chu sequence is greater than a quantity of minimum time-frequency resource units included in a maximum frequency domain resource that can be allocated; and sending, by the sending device, the time domain reference signal.

In one embodiment, the sending device generates the frequency domain reference signal by using the method in any embodiments of the first aspect.

According to a third aspect, a reference signal transmission method is provided, and includes: receiving, by a receiving device, the time domain reference signal; and converting, by the receiving device, the time domain reference signal from time domain to frequency domain, to generate a frequency domain reference signal, where the frequency domain reference signal includes a reference signal sequence mapped to a frequency domain resource group, the reference signal sequence is determined based on a Zadoff-Chu sequence and a length of the reference signal sequence, and a length value of the Zadoff-Chu sequence is greater than a quantity of minimum time-frequency resource units included in a maximum frequency domain resource that can be allocated.

In one embodiment, the receiving device generates the frequency domain reference signal by using the method in any embodiments of the first aspect.

In one embodiment, a device is provided, and includes a module configured to perform the method in any embodiments of the first aspect.

In one embodiment, a communications apparatus is provided, and includes a processing unit and a sending unit, to perform the method in any embodiments of the second aspect.

In one embodiment, a communications apparatus is provided, and includes a processor, a memory, and a transceiver, to perform the method in any embodiments of the second aspect.

In one embodiment, a communications apparatus is provided, and includes a processing unit and a sending unit, to perform the method in any embodiments of the third aspect.

In one embodiment, a communications apparatus is provided, and includes a processor, a memory, and a transceiver, to perform the method in any embodiments of the third aspect.

In one embodiment, a computer readable storage medium is provided, where the computer readable storage medium stores an instruction, and when the instruction is run on a computer, the computer is enabled to perform the method in any embodiments of the first aspect.

In one embodiment, a computer readable storage medium is provided, where the computer readable storage medium stores an instruction, and when the instruction is run on a computer, the computer is enabled to perform the method in any embodiments of the second aspect.

In one embodiment, a computer readable storage medium is provided, where the computer readable storage medium stores an instruction, and when the instruction is run on a computer, the computer is enabled to perform the method in any embodiments of the third aspect.

In one embodiment, a computer program product that includes an instruction is provided, where when the computer program product is run on a computer, the computer is enabled to perform the method in any embodiments of the first aspect.

In one embodiment, a computer program product that includes an instruction is provided, where when the computer program product is run on a computer, the computer is enabled to perform the method in any embodiments of the second aspect.

In one embodiment, a computer program product that includes an instruction is provided, where when the computer program product is run on a computer, the computer is enabled to perform the method in any embodiments of the third aspect.

BRIEF DESCRIPTION OF DRAWINGS

FIG. 1 is a schematic architectural diagram of a communications system to which embodiments of this application are applied;

FIG. 2 is a schematic diagram of a reference signal generation method according to an embodiment of this application;

FIG. 3 is a schematic diagram of generating a reference signal sequence by cyclically extending or truncating a ZC sequence according to an embodiment of this application;

FIG. 6 is a schematic diagram of a reference signal transmission method according to an embodiment of this application;

FIG. 7 is a schematic diagram of another reference signal transmission method according to an embodiment of this application;

FIG. 8 is a schematic structural diagram of a communications apparatus according to an embodiment of this application;

DESCRIPTION OF EMBODIMENTS

Figure 4:
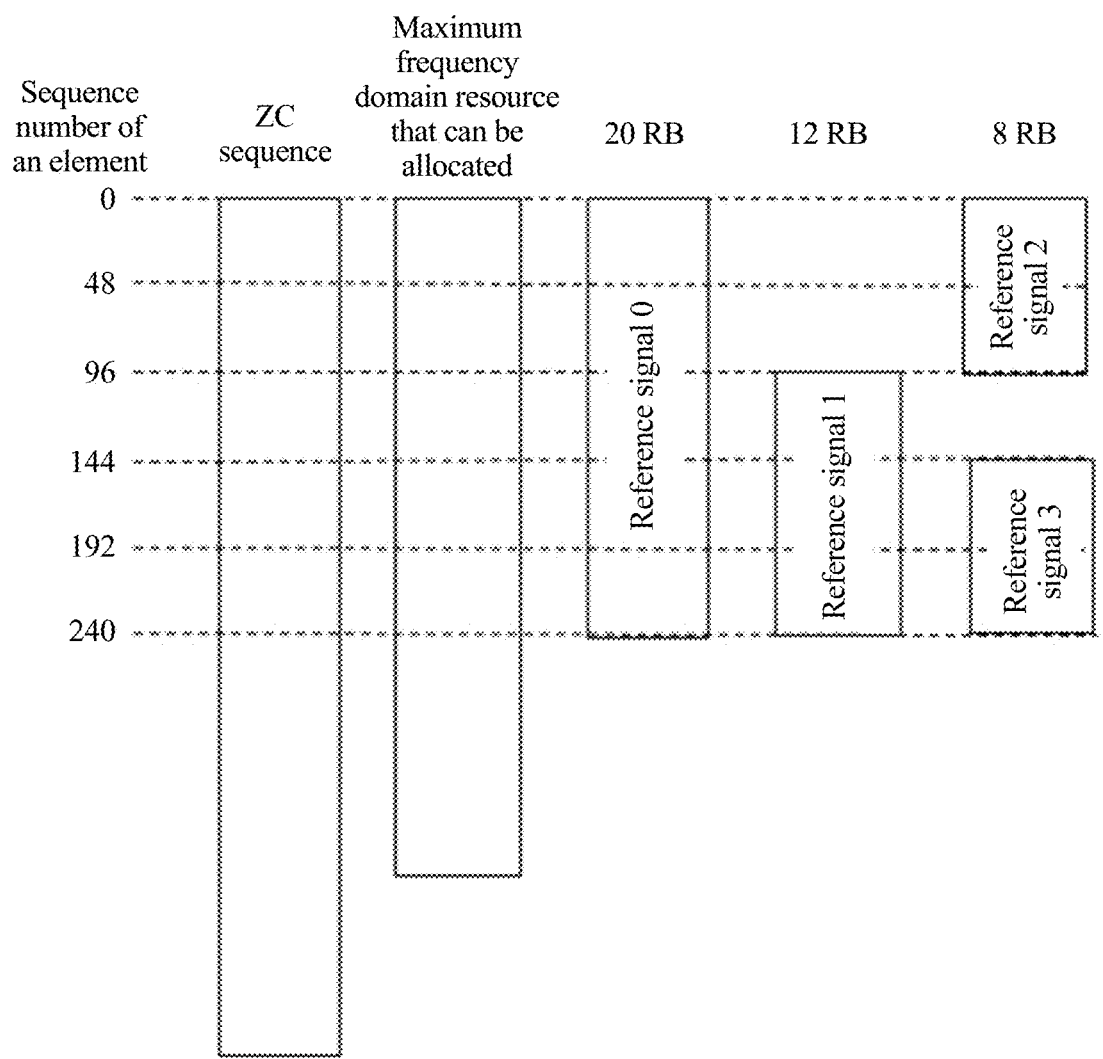
FIG. 4 is a schematic diagram of a reference signal sequence generation method according to an embodiment of this application.

A sending device and a receiving device in the embodiments of this application may be any device on a transmit end and any device on a receive end that transmit data in a wireless manner. The sending device and the receiving device may be any device having a wireless receiving and sending function, including but not limited to: a NodeB NodeB, an evolved NodeB eNodeB, a base station in a fifth-generation (the fifth generation, 5G) communications system, a base station or a network device in a future communications system, an access node in a Wi-Fi system, a wireless relay node, a wireless backhaul node, and user equipment (user equipment, UE). The UE may also be referred to as a terminal terminal, a mobile station (mobile station, MS), a mobile terminal (mobile terminal, MT), or the like. The UE may communicate with one or more core networks by using a radio access network (radio access network, RAN), or may access a distributed network in a self-organizing or grant-free manner. The UE may further access a wireless network in another manner for communication, or the UE may directly perform wireless communication with another UE. This is not limited in the embodiments of this application.

The sending device and the receiving device in the embodiments of this application may be deployed on land such as indoor or outdoor devices, handheld devices, or in-vehicle devices, or may be deployed on the water, or may be deployed on an airplane, a balloon, or a satellite in the air. The UE in the embodiments of this application may be a mobile phone (mobile phone), a tablet computer (Pad), a computer having a wireless receiving and sending function, a virtual reality (Virtual Reality, VR) terminal device, an augmented reality (Augmented Reality, AR) terminal device, a wireless terminal in industrial control (industrial control), a wireless terminal in self driving (self driving), a wireless terminal in remote medical (remote medical), a wireless terminal in smart grid (smart grid), a wireless terminal in transportation safety (transportation safety), a wireless terminal in smart city (smart city), a wireless terminal in smart home (smart home), or the like. An application scenario is not limited in the embodiments of this application.

FIG. 1 is a schematic architectural diagram of a communications system to which embodiments of this application are applied. As shown in FIG. 1, the communications system includes a core network device 110, a base station 120, UE 130, and UE 140 that are connected in a wireless manner, a wired manner, or another manner. The UE 130 and the UE 140 may be still or may be mobile. FIG. 1 is only a schematic diagram, and the communications system may further include another network device and/or another terminal device, which are/is not shown in FIG. 1.

The embodiments of this application may be applied to downlink data transmission, or may be applied to uplink data transmission, or may be applied to device-to-device (device-to-device, D2D) data transmission. For the downlink data transmission, a sending device is a base station, and a corresponding receiving device is UE. For the uplink data transmission, a sending device is UE, and a corresponding receiving device is a base station. For the D2D data transmission, a sending device is UE, and a corresponding receiving device is also UE. This is not limited in the embodiments of this application.

In an LTE system, there are two manners of reusing resources between user equipments (user equipment, UE). In one manner, time-frequency resources between the UEs do not overlap, and the resources are reused in a time division mode or a frequency division mode. In the other manner, time-frequency resources between the UEs completely overlap, and the resources are reused in a spatial division mode. When the resources between the UEs are reused in a time division mode or a frequency division mode, reference signals of different UEs are also orthogonal in a time division mode or a frequency division mode. When the resources between the UEs are reused in a spatial division mode, reference signals of different UEs may be orthogonal to each other by using orthogonal cover code (orthogonal cover code, OCC) in time division, frequency division, time domain, or frequency domain, or may be orthogonal to each other by performing different linear phase rotation on a same sequence.

In new radio (new radio, NR) of a fifth-generation (5th generation, 5G) mobile communications system, a block reference signal (block reference signal) method is proposed for a scenario in which a plurality of UEs or a plurality of transmit ports share a same or partially same time-frequency resource, to improve orthogonality between reference signals of different UEs or different transmit ports. In the block reference signal solution, a reference signal of each UE is divided into a plurality of blocks, and it is ensured that reference signals of different UEs are orthogonal in blocks, so as to ensure that the reference signals of the different UEs are entirely orthogonal. After the block reference signal is introduced, time-frequency resources of two UEs may be shared by using a block size as a granularity, and the time-frequency resources of the two UEs in spatial multiplexing do not need to completely overlap. Therefore, allocation of resources between UEs is more flexible.

In an application scenario of a dynamic TDD subframe structure, uplink and downlink subframe configurations may be different in neighboring cells. For example, a current subframe is configured as an uplink subframe in a cell C1, but the current subframe is configured as a downlink subframe in a neighboring cell C2 of the cell C1. It is assumed that geographical locations of two UEs: U1 and U2 are adjacent, but a serving cell of the U1 is the C1 and a serving cell of the U2 is the C2. In this case, if the U1 sends uplink data, downlink receiving of the U2 is seriously interfered with. To improve a success rate of receiving data by the U2, the U2 may perform interference suppression or interference cancellation on an interfering signal from the U1. To complete interference suppression or interference cancellation on the interfering signal, the U2 may measure and estimate a reference signal from the U1.

In an LTE system, a quantity n of minimum time-frequency resource units included in a transmission bandwidth needs to meet an equation $n=2^{x1} \cdot 3^{x2} \cdot 5^{x3}$, where x1, x2, and x3 are integers greater than or equal to 0. By using an LTE system with a 20 MHz system bandwidth as an example, there are 35 different resource allocation manners in total. Reference signal sequences corresponding to different resource allocation sizes are obtained by cyclically extending ZC sequences with different lengths. The cyclic extension is described in detail in FIG. 3 below. A reference signal sequence is related to only a resource allocation size, and unrelated to a resource allocation location. A frequency domain resource occupied by a reference signal of the U2 and a frequency domain resource occupied by a reference signal of the U1 may partially or completely overlap. Because the U2 does not know a start location of the reference signal of the U1 and a reference signal sequence used by the U1, the U2 needs to blindly detect and traverse various possible resource allocation sizes and resource allocation locations. Consequently, blind detection overheads are very high.

To reduce overheads of blindly detecting a reference signal sequence, the embodiments of this application provide a reference signal generation method, a reference signal transmission method, and a device. All reference signal sequences provided in the embodiments of this application are captured from a ZC sequence with a fixed length, and the ZC sequence is unrelated to a resource allocation size, so that when the U2 blindly detects the reference signal of the U1, there is no need to use ZC sequences corresponding to various possible resource allocation sizes, thereby reducing blind detection overheads. Further, when being captured from the ZC sequence, the reference signal sequences provided in the embodiments of this application are completely corresponding to resource allocation locations, so that when the U2 blindly detects the reference signal of the U1, there is no need to use various possible resource allocation locations of the U1, thereby further reducing blind detection overheads, and improving system performance.

FIG. 2 is a method for generating a frequency domain reference signal based on a ZC sequence according to an embodiment of this application. When a reference signal generated by using the method is applied to a communications system, a quantity of blind reference signal detection times can be greatly reduced, and system performance can be improved.

Block 210. Determine a reference signal sequence based on a ZC sequence and a length of the reference signal sequence, where a length value of the ZC sequence is greater than a quantity of minimum time-frequency resource units included in a maximum frequency domain resource that can be allocated.

The maximum frequency domain resource that can be allocated is a maximum frequency domain resource that can be allocated to a radio link, and a minimum time-frequency resource unit may have different definitions in different systems. For example, in an LTE system, a minimum time-frequency resource unit is referred to as a resource element (resource element, RE), and is a subcarrier resource on a time domain symbol. By using an LTE system with a 20 MHz bandwidth as an example, a maximum frequency domain resource that can be allocated to a radio link is 100 resource blocks (resource block, RB), and a quantity of included minimum time-frequency resource units is 1200. In this case, the quantity of minimum time-frequency resource units included in the maximum frequency domain resource that can be allocated is 1200.

Specifically, the reference signal sequence is a sequence that is captured from the ZC sequence and whose length is equal to the length of the reference signal sequence. For how to capture the reference signal sequence from the ZC sequence, refer to related descriptions in FIG. 3 below.

The length of the reference signal sequence is equal to a quantity of minimum time-frequency resource units included in a frequency domain resource group that carries the reference signal sequence, in other words, a bandwidth of the frequency domain resource group is corresponding to the length of the reference signal sequence. The frequency domain resource group that carries the reference signal sequence may also be referred to as a frequency domain resource of the reference signal. It may be understood that a size of the frequency domain resource group may be the same as a size of the maximum frequency domain resource that can be allocated, or may be less than a size of the maximum frequency domain resource that can be allocated. The size of the frequency domain resource group herein is the quantity of minimum time-frequency resource units included in the frequency domain resource group. When sizes of frequency domain resource groups are the same, frequency offsets thereof may be different. As shown in FIG. 4, both bandwidths of frequency domain resources of a reference signal 2 and a reference signal 3 are eight RBs, but the frequency domain resource of the reference signal 3 is offset by 12 RBs relative to the frequency domain resource of the reference signal 2.

Block 220. Map the reference signal sequence to a frequency domain resource group, to generate a frequency domain reference signal.

A reference signal sequence in any frequency domain resource group of the maximum frequency domain resource that can be allocated may be obtained by using the foregoing method, and the obtained reference signal sequence is mapped to a corresponding frequency domain resource group, to generate a frequency domain reference signal.

The following describes a reference signal generation process more specifically.

The ZC sequence $X_q(m)$ may be represented by a formula (1):

$$X_q(m) = e^{-j\frac{\pi \cdot q \cdot m \cdot (m+1)}{N_{zc}}}, \qquad (1.)$$

where m represents a sequence number of an element in the ZC sequence, m is an integer and $0 \leq m \leq N_{zc}-1$, j represents an imaginary unit, q represents a root of the ZC sequence, $N_{zc}$ represents the length of the ZC sequence, and q and $N_{zc}$ are mutually prime. It may be understood that in this application, there may be different manners of numbering a number of an array or a sequence such as a value of m, and counting may start from 1 or 0. This is not limited in this embodiment of this application.

The ZC sequence determined based on q may also be referred to as a $q^{th}$ root ZC sequence (the $q^{th}$ root ZC sequence) with the length of $N_{zc}$. The ZC sequence has a good auto-correlation, in other words, the sequence has a large auto-correlation peak. Two ZC sequences that have a same length but different roots have a good cross-correlation, in other words, a cross-correlation value is very small. In an existing LTE system, the length value of the ZC sequence is a prime number, but $N_{zc}$ may alternatively be a non-prime number in this embodiment of this application.

The ZC sequence defined by the formula (1) is essentially a set of ZC sequences with lengths of $N_{zc}$, and the sequence set may include ZC sequences having different values of q.

When the length of the reference signal sequence is inconsistent with that of the ZC sequence, a base sequence (base sequence) $\overline{R}_q(n)$ of the reference signal sequence may be generated based on the ZC sequence $X_q(m)$ which is shown in a formula (2):

$$\overline{R}_q(n)=X_q(n \bmod N_{zc}) \qquad (2.)$$

where n is a sequence number of an element in the base sequence, n is an integer and $0 \leq n \leq N-1$, and N is a length of the base sequence. As shown in FIG. 3 (a), when N is greater than $N_{zc}$, the formula (2) may be understood as that the base sequence with the length of N is obtained by cyclically extending the ZC sequence with the length of $N_{zc}$. As shown in FIG. 3 (b), when N is less than $N_{zc}$, the formula (2) may be understood as that the base sequence with the length of N is obtained by truncating the ZC sequence with the length of $N_{zc}$.

Because the length $N_{zc}$ of the ZC sequence is greater than the quantity of minimum time-frequency resource units included in the maximum frequency domain resource that can be allocated, in other words, $N_{zc} > N$, the formula (2) actually indicates that a reference signal sequence with a length of N is obtained by truncating the ZC sequence with the length of $N_{zc}$. Therefore, the formula (2) may be simplified as:

$$\overline{R}_q(n)=X_q(n) \qquad (3)$$

According to the formula (2) and the formula (3), data starts to be captured from a sequence start location of the ZC sequence with the length of $N_{zc}$, to obtain the reference signal sequence with the length of N, in other words, data of the end of the ZC sequence that exceeds the length N is truncated. A start location and a capturing manner of captured data are not limited in this application. For example, data may alternatively start to be captured from an $(n_0)^{th}$ data element in the sequence, to obtain the reference signal sequence with the length of N.

To further obtain more reference signal sequences, different linear phase rotation (linear phase rotation) may be performed on the base sequence $\overline{R}_q(n)$ in frequency domain. Different reference signal sequences obtained by performing different linear phase rotation on a same base sequence are completely orthogonal, and therefore the reference signal sequences obtained through the linear phase rotation do not interfere with each other. A reference signal sequence $R_q^{\%}(n)$ is obtained by performing linear phase rotation on the base sequence $\overline{R}_q(n)$, which is shown in a formula (4):

$$R_q^{\%}(n)=e^{j \cdot \alpha \cdot n}\overline{R}_q(n) \qquad (4.)$$

where $\alpha$ is a phase of linear phase rotation, and $\alpha$ is a real number; assuming that $\alpha=(c \cdot \pi)/6$, a value of c may range from 0 to 11, and therefore 12 different reference signal sequences that are orthogonal to each other may be obtained by performing different phase rotation on a basic reference signal sequence. Performing linear phase rotation in frequency domain is equivalent to performing cyclic shift (cyclic shift) in time domain.

With reference to the formula (2) and the formula (4), a method for generating the reference signal sequence $R_q^{\%}(n)$ based on the ZC sequence $X_q(m)$ may be shown in a formula (5):

$$R_q^{\%}(n)=e^{j \cdot \alpha \cdot n}X_q(n \bmod N_{zc}) \qquad (5)$$

With reference to the formula (3) and the formula (4), a method for generating the reference signal sequence $R_q^{\%}(n)$ based on the ZC sequence $X_q(m)$ may be shown in a formula (6):

$$R_q^{\%}(n)=e^{j \cdot \alpha \cdot n}X_q(n) \qquad (6.)$$

The ZC sequence $X_q(m)$ may be determined based on the length value $N_{zc}$ of the ZC sequence and the root value q of the ZC sequence. Correspondingly, the base sequence $\overline{R}_q(n)$ of the reference signal sequence generated based on the ZC sequence $X_q(m)$ may be determined based on the length value $N_{zc}$ of the ZC sequence and the root value q of the ZC sequence, and the reference signal sequence $R_q^{\%}(n)$ generated based on the ZC sequence $X_q(m)$ may be determined based on the length value $N_{zc}$ of the ZC sequence, the root value q of the ZC sequence, and the phase a of the linear phase rotation.

In one embodiment, a root of a ZC sequence used in a cell is determined based on a cell identifier, and then a sequence whose length is the length of the reference signal sequence is captured from the ZC sequence to serve as the reference signal sequence. A ZC sequence that needs to be used when blind detection is performed on this generated reference signal is unrelated to a resource allocation size of the reference signal. Therefore, a quantity of blind detection times can be reduced, so as to reduce blind detection overheads.

FIG. 4 shows a method for capturing a reference signal sequence from a ZC sequence. The reference signal sequence is further determined based on a location, in a maximum frequency domain resource that can be allocated, of a frequency domain resource group that carries the reference signal sequence. As shown in FIG. 4, a frequency domain resource of a reference signal 0 starts to be allocated from a resource element (resource element, RE) numbered 0. A size of the frequency domain resource of the reference signal 0, namely, a size of a frequency domain resource group that carries a reference signal sequence of the reference signal 0, is 20 RBs, namely, 240 REs. Therefore, a sequence with a length of 240 starts to be captured from a location 0 of the ZC sequence to serve as the reference signal sequence of the reference signal 0. A size of a frequency domain resource of a reference signal 1 is 12 RBs, and a sequence with a length of 144 starts to be captured from a location 96 of the ZC sequence to serve as a reference signal sequence of the reference signal 1. Both sizes of frequency domain resources of a reference signal 2 and a reference signal 3 are eight RBs, a sequence with a length of 96 starts to be captured from a location 0 of the ZC sequence to serve as a reference signal sequence of the reference signal 2, and a sequence with a length of 96 starts to be captured from a location 144 of the ZC sequence to serve as a reference signal sequence of the reference signal 3.

The reference signal sequence generated by using the reference signal generation method provided in this embodiment of this application is a sequence that is completely corresponding to the location of the frequency domain resource group and that is captured from the ZC sequence, so that when blind detection is performed on the reference signal, there is no need to use various possible locations of the frequency domain resource group, and a quantity of blind detection times can be further reduced, thereby reducing blind detection overheads, and improving system performance.

An example in which the reference signal sequence is determined based on a location of a start location of the frequency domain resource group in the maximum frequency domain resource that can be allocated is used below for description. It may be understood that the reference signal sequence may alternatively be determined based on a location of an end location of the frequency domain resource group in the maximum frequency domain resource that can be allocated. However, this is not limited in this embodiment of this application.

Assuming that the start location of the frequency domain resource group is $N_{ini}$, and minimum time-frequency resource units are included in the frequency domain resource group are consecutive, the reference signal sequence $R_q(n)$ may be represented by a formula (7):

$$R_q(n)=R_q^{\%}(n+N_{ini}) \qquad (7).$$

With reference to the formula (5) and the formula (7), a method for generating the reference signal sequence $R_q(n)$ based on the ZC sequence $X_q(m)$ may be shown in a formula (8):

$$R_q(n)=e^{j\cdot\alpha\cdot n}X_q((n+N_{ini})\bmod N_{zc}) \qquad (8).$$

With reference to the formula (6) and the formula (7), a method for generating the reference signal sequence $R_q(n)$ based on the ZC sequence $X_q(m)$ may be shown in a formula (9):

$$R_q(n)=e^{j\cdot\alpha\cdot n}X_q(n+N_{ini}) \qquad (9.),\text{ where}$$

$$n+N_{ini}<N_{zc}.$$

By using an LTE system with a 20 MHz system bandwidth as an example, the maximum frequency domain resource that can be allocated is 100 RBs, and a bandwidth of the reference signal may be all possible assigned bandwidths ranging from one RB to 100 RBs. Under constraint conditions in which RCM<5.3, a maximum cross-correlation is less than 0.73, and 30 roots of the ZC sequence are required, a root value q of the ZC sequence that meets these constraint conditions is shown in Table 1, and the length $N_{zc}$ of the ZC sequence is 479971 and $q_{idx}$ is a number example of q in the table. A maximum cross-correlation of a group of sequences with a same length is a maximum amplitude value in a cross-correlation result obtained by performing a cross-correlation operation on any two sequences in this group of sequences. The ZC sequence is generated based on a value q in Table 1, and further, the reference signal generated by using the foregoing reference signal generation method is characterized by a low PAPR/RCM, so that blind reference signal detection overheads can be greatly reduced, and system performance can be improved.

TABLE 1

| | $q_{idx}$ | | | | | | | | |
|---|---|---|---|---|---|---|---|---|---|
| 0 | 1 | 2 | 3 | 4 | 5 | 6 | 7 | 8 | 9 |
| q | | | | | | | | | |
| 24335 | 35852 | 49443 | 65019 | 76272 | 88558 | 102028 | 126841 | 139505 | 150710 |

| | $q_{idx}$ | | | | | | | | |
|---|---|---|---|---|---|---|---|---|---|
| 10 | 11 | 12 | 13 | 14 | 15 | 16 | 17 | 18 | 19 |
| q | | | | | | | | | |
| 169872 | 181751 | 197023 | 210577 | 222328 | 253191 | 264402 | 276530 | 296245 | 307534 |

| | $q_{idx}$ | | | | | | | | |
|---|---|---|---|---|---|---|---|---|---|
| 20 | 21 | 22 | 23 | 24 | 25 | 26 | 27 | 28 | 29 |
| q | | | | | | | | | |
| 329261 | 340466 | 352513 | 368238 | 387393 | 402362 | 413569 | 424829 | 437224 | 448552 |

By using an LTE system with a 20 MHz system bandwidth as an example, when the bandwidth of the reference signal is one RB or two RBs, a quadrature phase shift keying (quadrature phase shift keying, QPSK) sequence obtained through computer search is used for the reference signal, and the ZC sequence is used for the reference signal when the bandwidth of the reference signal is three or more RBs. Considering that a PAPR/RCM of the QPSK sequence obtained through computer search is very low, in another possible embodiment, when the bandwidth of the reference signal is one RB or two RBs, the reference signal sequence is still generated by using the QPSK sequence in the existing LTE system; when the bandwidth of the reference signal is all possible assigned bandwidths ranging from three RBs to 100 RBs, the reference signal sequence is generated by using the foregoing reference signal sequence generation method. It may be understood that the bandwidth of the reference signal is a bandwidth of the frequency domain resource group. Under constraint conditions in which RCM<5.1, a maximum cross-correlation is less than 0.445, and 30 roots of the ZC sequence are required, a root value q of the ZC sequence that meets these constraint conditions is shown in Table 2, and the length $N_{zc}$ of the ZC sequence in the table is 119993. Compared with the reference signal generated based on a root sequence of the ZC sequence shown in Table 1, a reference signal generated based on a root sequence of the ZC sequence shown in Table 2 has a lower PAPR/RCM although a quantity of blind detection times is increased.

TABLE 2

| | $q_{idx}$ | | | | | | | | |
|---|---|---|---|---|---|---|---|---|---|
| 0 | 1 | 2 | 3 | 4 | 5 | 6 | 7 | 8 | 9 |

| q | 2197 | 3470 | 4396 | 6191 | 7683 | 9025 | 10362 | 11745 | 13755 | 14512 |
|---|---|---|---|---|---|---|---|---|---|---|

| | $q_{idx}$ | | | | | | | | |
|---|---|---|---|---|---|---|---|---|---|
| 10 | 11 | 12 | 13 | 14 | 15 | 16 | 17 | 18 | 19 |

| q | 17680 | 18691 | 20638 | 23545 | 24419 | 25507 | 30658 | 37305 | 40689 | 52894 |
|---|---|---|---|---|---|---|---|---|---|---|

| | $q_{idx}$ | | | | | | | | |
|---|---|---|---|---|---|---|---|---|---|
| 20 | 21 | 22 | 23 | 24 | 25 | 26 | 27 | 28 | 29 |

| q | 58095 | 67099 | 71288 | 79123 | 82688 | 89335 | 108248 | 110302 | 112310 | 116074 |
|---|---|---|---|---|---|---|---|---|---|---|

In one embodiment of this application, possible bandwidth assignment of the frequency domain resource group is grouped, and the reference signal sequence is separately generated by using different sequence groups. For example, frequency domain resource groups whose bandwidths are one RB and two RBs are grouped into a first group, and the reference signal sequence is still generated by using the QPSK sequence in the current LTE system; frequency domain resource groups whose bandwidths range from three RBs to 30 RBs are grouped into a second group, and the reference signal sequence is generated by using root sequences of a group of ZC sequences shown in Table 3; and frequency domain resource groups whose bandwidths range from 31 RBs to 100 RBs are grouped into a third group, and the reference signal sequence is generated by using root sequences of a group of ZC sequence shown in Table 4. Compared with the reference signal generated based on a root sequence of the ZC sequence shown in Table 1, a reference signal generated based on a root sequence of the ZC sequence shown in Table 3 or Table 4 has a lower PAPR/RCM although a quantity of blind detection times is increased.

Considering that the frequency domain resource group has all possible assigned bandwidths ranging from three RBs to 30 RBs, under constraint conditions in which RCM<4.9, a maximum cross-correlation is less than 0.39, and 30 roots of the ZC sequence are required, a root value q of the ZC sequence that meets these constraint conditions is shown in Table 3, and the length $N_{zc}$ of the ZC sequence in the table is 119993.

TABLE 3

| $q_{idx}$ | | | | | | | | | |
|---|---|---|---|---|---|---|---|---|---|
| 0 | 1 | 2 | 3 | 4 | 5 | 6 | 7 | 8 | 9 |
| q 2012 | 3107 | 4228 | 5550 | 6811 | 7801 | 8812 | 10235 | 11558 | 12790 |
| $q_{idx}$ | | | | | | | | | |
| 10 | 11 | 12 | 13 | 14 | 15 | 16 | 17 | 18 | 19 |
| q 14316 | 16717 | 17689 | 18802 | 20361 | 21503 | 23269 | 24419 | 29129 | 30559 |
| $q_{idx}$ | | | | | | | | | |
| 20 | 21 | 22 | 23 | 24 | 25 | 26 | 27 | 28 | 29 |
| q 33516 | 34631 | 37305 | 39162 | 43862 | 55093 | 75465 | 91126 | 112310 | 116886 |

Considering that the frequency domain resource group has all possible assigned bandwidths ranging from 31 RBs to 100 RBs, under constraint conditions in which RCM<4.9, a maximum cross-correlation is less than 0.16, and 30 roots of the ZC sequence are required, a root value q of the ZC sequence that meets these constraint conditions is shown in Table 4, and the length $N_{zc}$ of the ZC sequence in the table is 119993.

TABLE 4

| $q_{idx}$ | | | | | | | | | |
|---|---|---|---|---|---|---|---|---|---|
| 0 | 1 | 2 | 3 | 4 | 5 | 6 | 7 | 8 | 9 |
| q 507 | 1075 | 3666 | 9383 | 10860 | 13232 | 19372 | 22346 | 23875 | 26108 |
| $q_{idx}$ | | | | | | | | | |
| 10 | 11 | 12 | 13 | 14 | 15 | 16 | 17 | 18 | 19 |
| q 27421 | 28546 | 29868 | 35720 | 38589 | 39706 | 41607 | 42816 | 47593 | 51350 |
| $q_{idx}$ | | | | | | | | | |
| 20 | 21 | 22 | 23 | 24 | 25 | 26 | 27 | 28 | 29 |
| q 56401 | 58475 | 59690 | 72113 | 73763 | 88022 | 92572 | 93944 | 100080 | 105692 |

The quantity of minimum time-frequency resource units included in the maximum frequency domain resource that can be allocated may vary with an actual case. By using LTE as an example, a maximum bandwidth that can be assigned is 110 RBs, and a maximum bandwidth that can be actually assigned and that meets a quantity $n=2^{x1} \cdot 3^{x2} \cdot 5^{x3}$ of subcarriers is 108 RBs, where x1, x2, and x3 are integers greater than or equal to 0. However, in actual application, because a specific protection bandwidth needs to be reserved, the maximum frequency domain resource that can be allocated in LTE is 100 RBs, namely, 1200 subcarriers. When out-of-band (out of band, OOB) suppression of a waveform is alleviated in a manner such as filtering or weighted overlap and add (weighted overlap and add, WOLA), or when such a wide protection band is not required, the maximum frequency domain resource that can be actually allocated may exceed 100 RBs.

When the maximum frequency domain resource that can be allocated is 108 RBs, namely, 1296 subcarriers in total, considering that the frequency domain resource group may have all possible assigned bandwidths ranging from three RBs to 108 RBs, under constraint conditions in which RCM<5.1, a maximum cross-correlation is less than 0.44, and 30 roots of the ZC sequence are required, a root value q of the ZC sequence that meets these constraint conditions is shown in Table 5, and the length $N_{zc}$ of the ZC sequence in the table is 131969.

TABLE 5

| $q_{idx}$ | 0 | 1 | 2 | 3 | 4 | 5 | 6 | 7 | 8 | 9 |
|---|---|---|---|---|---|---|---|---|---|---|
| q | 2908 | 5919 | 8108 | 9176 | 11359 | 12842 | 13721 | 18287 | 19213 | 21435 |

| $q_{idx}$ | 10 | 11 | 12 | 13 | 14 | 15 | 16 | 17 | 18 | 19 |
|---|---|---|---|---|---|---|---|---|---|---|
| q | 22441 | 25895 | 27039 | 30666 | 36263 | 38169 | 40822 | 42738 | 44949 | 51705 |

| $q_{idx}$ | 20 | 21 | 22 | 23 | 24 | 25 | 26 | 27 | 28 | 29 |
|---|---|---|---|---|---|---|---|---|---|---|
| q | 54664 | 59740 | 61399 | 67366 | 68376 | 70570 | 78403 | 82997 | 86400 | 95108 |

When the maximum frequency domain resource that can be allocated is 108 RBs, namely, 1296 subcarriers in total, considering that the frequency domain resource group may have all possible assigned bandwidths ranging from three RBs to 108 RBs, under constraint conditions in which RCM<5.2, a maximum cross-correlation is less than 0.5, and 60 roots of the ZC sequence are required, a root value q of the ZC sequence that meets these constraint conditions is shown in Table 6, and the length $N_{zc}$ of the ZC sequence in the table is 131969.

TABLE 6

| $q_{idx}$ | 0 | 1 | 2 | 3 | 4 | 5 | 6 | 7 | 8 | 9 |
|---|---|---|---|---|---|---|---|---|---|---|
| q | 2150 | 2908 | 3741 | 4942 | 5644 | 6727 | 8108 | 9176 | 11359 | 12842 |

| $q_{idx}$ | 10 | 11 | 12 | 13 | 14 | 15 | 16 | 17 | 18 | 19 |
|---|---|---|---|---|---|---|---|---|---|---|
| q | 13572 | 15178 | 16174 | 18065 | 19213 | 21357 | 22391 | 23057 | 25801 | 27039 |

| $q_{idx}$ | 20 | 21 | 22 | 23 | 24 | 25 | 26 | 27 | 28 | 29 |
|---|---|---|---|---|---|---|---|---|---|---|
| q | 28108 | 29864 | 30666 | 31734 | 33739 | 36263 | 38169 | 39193 | 40822 | 41510 |

| $q_{idx}$ | 30 | 31 | 32 | 33 | 34 | 35 | 36 | 37 | 38 | 39 |
|---|---|---|---|---|---|---|---|---|---|---|
| q | 42738 | 44750 | 45569 | 51705 | 53466 | 54488 | 57977 | 59740 | 61399 | 62351 |

| $q_{idx}$ | 40 | 41 | 42 | 43 | 44 | 45 | 46 | 47 | 48 | 49 |
|---|---|---|---|---|---|---|---|---|---|---|
| q | 63593 | 64325 | 67298 | 70564 | 78403 | 86400 | 90459 | 91147 | 95108 | 98230 |

| $q_{idx}$ | 50 | 51 | 52 | 53 | 54 | 55 | 56 | 57 | 58 | 59 |
|---|---|---|---|---|---|---|---|---|---|---|
| q | 100235 | 101303 | 109578 | 112756 | 115795 | 116791 | 118248 | 122793 | 125242 | 126752 |

Optionally, a PAPR/RCM/low cubic metric (CM) instead of a cross-correlation may be used as a constraint condition. By using an LTE system with a 20 MHz system bandwidth as an example, the maximum frequency domain resource that can be allocated is 100 RBs, and the bandwidth of the reference signal may be all possible assigned bandwidths ranging from one RB to 100 RBs. Under constraint conditions in which RCM<5.3, no cross-correlation threshold is set, and 60 roots of the ZC sequence are required, a root value q of the ZC sequence that meets these constraint conditions is shown in Table 6A, and the length $N_{zc}$ of the ZC sequence is 21157 and $q_{idx}$ is a number example of q in the table.

TABLE 6A

| $q_{idx}$ | 1 | 2 | 3 | 4 | 5 | 6 | 7 | 8 | 9 | 10 |
|---|---|---|---|---|---|---|---|---|---|---|
| q | 1149 | 1203 | 1215 | 1345 | 1827 | 1873 | 1962 | 2040 | 2276 | 2927 |
| $q_{idx}$ | 11 | 12 | 13 | 14 | 15 | 16 | 17 | 18 | 19 | 20 |
| q | 2931 | 3196 | 3201 | 3223 | 3406 | 3787 | 5596 | 6247 | 6276 | 6426 |
| $q_{idx}$ | 21 | 22 | 23 | 24 | 25 | 26 | 27 | 28 | 29 | 30 |
| q | 7736 | 7749 | 7768 | 8693 | 8767 | 8779 | 8970 | 9216 | 9983 | 9996 |
| $q_{idx}$ | 31 | 32 | 33 | 34 | 35 | 36 | 37 | 38 | 39 | 40 |
| q | 11161 | 11174 | 11941 | 12187 | 12378 | 12390 | 12464 | 13389 | 13408 | 13421 |
| $q_{idx}$ | 41 | 42 | 43 | 44 | 45 | 46 | 47 | 48 | 49 | 50 |
| q | 14731 | 14881 | 14910 | 15561 | 17370 | 17751 | 17934 | 17956 | 17961 | 18226 |
| $q_{idx}$ | 51 | 52 | 53 | 54 | 55 | 56 | 57 | 58 | 59 | 60 |
| q | 18230 | 18881 | 19117 | 19195 | 19284 | 19330 | 19812 | 19942 | 19954 | 20008 |

By using an LTE system with a 20 MHz system bandwidth as an example, the maximum frequency domain resource that can be allocated is 110 RBs, and the bandwidth of the reference signal may be all possible assigned bandwidths ranging from one RB to 110 RBs. Under constraint conditions in which RCM<5.3, no cross-correlation threshold is set, and 60 roots of the ZC sequence are required, a root value q of the ZC sequence that meets these constraint conditions is shown in Table 6B, and the length $N_{zc}$ of the ZC sequence is 22109 and $q_{idx}$ is a number example of q in the table.

TABLE 6B

| $q_{idx}$ | 1 | 2 | 3 | 4 | 5 | 6 | 7 | 8 | 9 | 10 |
|---|---|---|---|---|---|---|---|---|---|---|
| q | 1359 | 1447 | 1662 | 1901 | 1903 | 1945 | 2540 | 2666 | 2995 | 3572 |
| $q_{idx}$ | 11 | 12 | 13 | 14 | 15 | 16 | 17 | 18 | 19 | 20 |

TABLE 6B-continued

| | | | | | | | | | | |
|---|---|---|---|---|---|---|---|---|---|---|
| q | 3874 | 4709 | 5039 | 5871 | 6681 | 6743 | 6933 | 7943 | 8165 | 8439 |

| $q_{idx}$ | | | | | | | | | | |
|---|---|---|---|---|---|---|---|---|---|---|
| | 21 | 22 | 23 | 24 | 25 | 26 | 27 | 28 | 29 | 30 |
| q | 8463 | 9126 | 9175 | 9592 | 9713 | 9898 | 10278 | 10343 | 10344 | 10371 |

| $q_{idx}$ | | | | | | | | | | |
|---|---|---|---|---|---|---|---|---|---|---|
| | 31 | 32 | 33 | 34 | 35 | 36 | 37 | 38 | 39 | 40 |
| q | 11738 | 11765 | 11766 | 11831 | 12211 | 12396 | 12517 | 12934 | 12983 | 13646 |

| $q_{idx}$ | | | | | | | | | | |
|---|---|---|---|---|---|---|---|---|---|---|
| | 41 | 42 | 43 | 44 | 45 | 46 | 47 | 48 | 49 | 50 |
| q | 13670 | 13944 | 14166 | 15176 | 15366 | 15428 | 16238 | 17070 | 17400 | 18235 |

| $q_{idx}$ | | | | | | | | | | |
|---|---|---|---|---|---|---|---|---|---|---|
| | 51 | 52 | 53 | 54 | 55 | 56 | 57 | 58 | 59 | 60 |
| q | 18537 | 19114 | 19443 | 19569 | 20164 | 20206 | 20208 | 20447 | 20662 | 20750 |

By using an LTE system with a 20 MHz system bandwidth as an example, the maximum frequency domain resource that can be allocated is 100 RBs, the bandwidth of the reference signal may be all possible assigned bandwidths ranging from three RBs to 100 RBs, and the reference signal sequence is generated by using the QPSK sequence in the current LTE system when the bandwidth of the reference signal is one RB or two RBs. Under constraint conditions in which RCM<5.3, no cross-correlation threshold is set, and 60 roots of the ZC sequence are required, a root value q of the ZC sequence that meets these constraint conditions is shown in Table 6C, and the length $N_{zc}$ of the ZC sequence is 8431 and $q_{idx}$ is a number example of q in the table.

TABLE 6C

| $q_{idx}$ | | | | | | | | | | |
|---|---|---|---|---|---|---|---|---|---|---|
| | 1 | 2 | 3 | 4 | 5 | 6 | 7 | 8 | 9 | 10 |
| q | 149 | 163 | 239 | 245 | 250 | 328 | 341 | 390 | 437 | 1092 |

| $q_{idx}$ | | | | | | | | | | |
|---|---|---|---|---|---|---|---|---|---|---|
| | 11 | 12 | 13 | 14 | 15 | 16 | 17 | 18 | 19 | 20 |
| q | 1168 | 1231 | 1232 | 1259 | 1284 | 1451 | 1478 | 2164 | 2206 | 2276 |

| $q_{idx}$ | | | | | | | | | | |
|---|---|---|---|---|---|---|---|---|---|---|
| | 21 | 22 | 23 | 24 | 25 | 26 | 27 | 28 | 29 | 30 |
| q | 2625 | 2738 | 2748 | 3088 | 3344 | 3414 | 3651 | 3812 | 4090 | 4140 |

| $q_{idx}$ | | | | | | | | | | |
|---|---|---|---|---|---|---|---|---|---|---|
| | 31 | 32 | 33 | 34 | 35 | 36 | 37 | 38 | 39 | 40 |
| q | 4291 | 4341 | 4619 | 4780 | 5017 | 5087 | 5343 | 5683 | 5693 | 5806 |

| $q_{idx}$ | | | | | | | | | | |
|---|---|---|---|---|---|---|---|---|---|---|
| | 41 | 42 | 43 | 44 | 45 | 46 | 47 | 48 | 49 | 50 |
| q | 6155 | 6225 | 6267 | 6953 | 6980 | 7147 | 7172 | 7199 | 7200 | 7263 |

| $q_{idx}$ | | | | | | | | | | |
|---|---|---|---|---|---|---|---|---|---|---|
| | 51 | 52 | 53 | 54 | 55 | 56 | 57 | 58 | 59 | 60 |
| q | 7339 | 7994 | 8041 | 8090 | 8103 | 8181 | 8186 | 8192 | 8268 | 8282 |

By using an LTE system with a 20 MHz system bandwidth as an example, the maximum frequency domain resource that can be allocated is 110 RBs, the bandwidth of the reference signal may be all possible assigned bandwidths ranging from three RBs to 110 RBs, and the reference signal sequence is generated by using the QPSK sequence in the current LTE system when the bandwidth of the reference signal is one RB or two RBs. Under constraint conditions in which RCM<5.3, no cross-correlation threshold is set, and 60 roots of the ZC sequence are required, a root value q of the ZC sequence that meets these constraint conditions is shown in Table 6D, and the length $N_{zc}$ of the ZC sequence is 9781 and $q_{idx}$ is a number example of q in the table.

TABLE 6D

| | | | | | $q_{idx}$ | | | | | |
|---|---|---|---|---|---|---|---|---|---|---|
| | 1 | 2 | 3 | 4 | 5 | 6 | 7 | 8 | 9 | 10 |
| q | 214 | 293 | 366 | 437 | 531 | 841 | 1189 | 1588 | 1680 | 1741 |
| | | | | | $q_{idx}$ | | | | | |
| | 11 | 12 | 13 | 14 | 15 | 16 | 17 | 18 | 19 | 20 |
| q | 1805 | 1856 | 2118 | 2352 | 2389 | 2627 | 2820 | 2837 | 3336 | 3366 |
| | | | | | $q_{idx}$ | | | | | |
| | 21 | 22 | 23 | 24 | 25 | 26 | 27 | 28 | 29 | 30 |
| q | 3440 | 3715 | 3847 | 3971 | 4015 | 4242 | 4664 | 4713 | 4754 | 4761 |
| | | | | | $q_{idx}$ | | | | | |
| | 31 | 32 | 33 | 34 | 35 | 36 | 37 | 38 | 39 | 40 |
| q | 5020 | 5027 | 5068 | 5117 | 5539 | 5766 | 5810 | 5934 | 6066 | 6341 |
| | | | | | $q_{idx}$ | | | | | |
| | 41 | 42 | 43 | 44 | 45 | 46 | 47 | 48 | 49 | 50 |
| q | 6415 | 6445 | 6944 | 6961 | 7154 | 7392 | 7429 | 7663 | 7925 | 7976 |
| | | | | | $q_{idx}$ | | | | | |
| | 51 | 52 | 53 | 54 | 55 | 56 | 57 | 58 | 59 | 60 |
| q | 8040 | 8101 | 8193 | 8592 | 8940 | 9250 | 9344 | 9415 | 9488 | 9567 |

$q_{idx}$ in Table 1 to Table 6D described above is merely a number example of a value of q, and no limitation is imposed on a sequence of values of q. $q_{idx}$ includes another numbering form, for example, numbering may start from 0, or numbering may be performed in another sequence. For example, a number $q_{idx}$ corresponding to q=2908 in Table 5 is 0, and the number may be 1, 30, or another value. Table 1 to Table 6D described above may include no $q_{idx}$, but only show a set of corresponding values of q.

An embodiment of this application further provides another method for capturing a reference signal sequence from a ZC sequence: When the reference signal sequence is captured from the ZC sequence, a location, in a maximum frequency domain resource that can be allocated, of a frequency domain resource group that carries the reference signal sequence is not considered. For example, regardless of the location of the frequency domain resource group in the maximum frequency domain resource that can be allocated, a sequence whose length is a length of the reference signal sequence is captured from the start of the ZC sequence to serve as the reference signal sequence.

Figure 5:
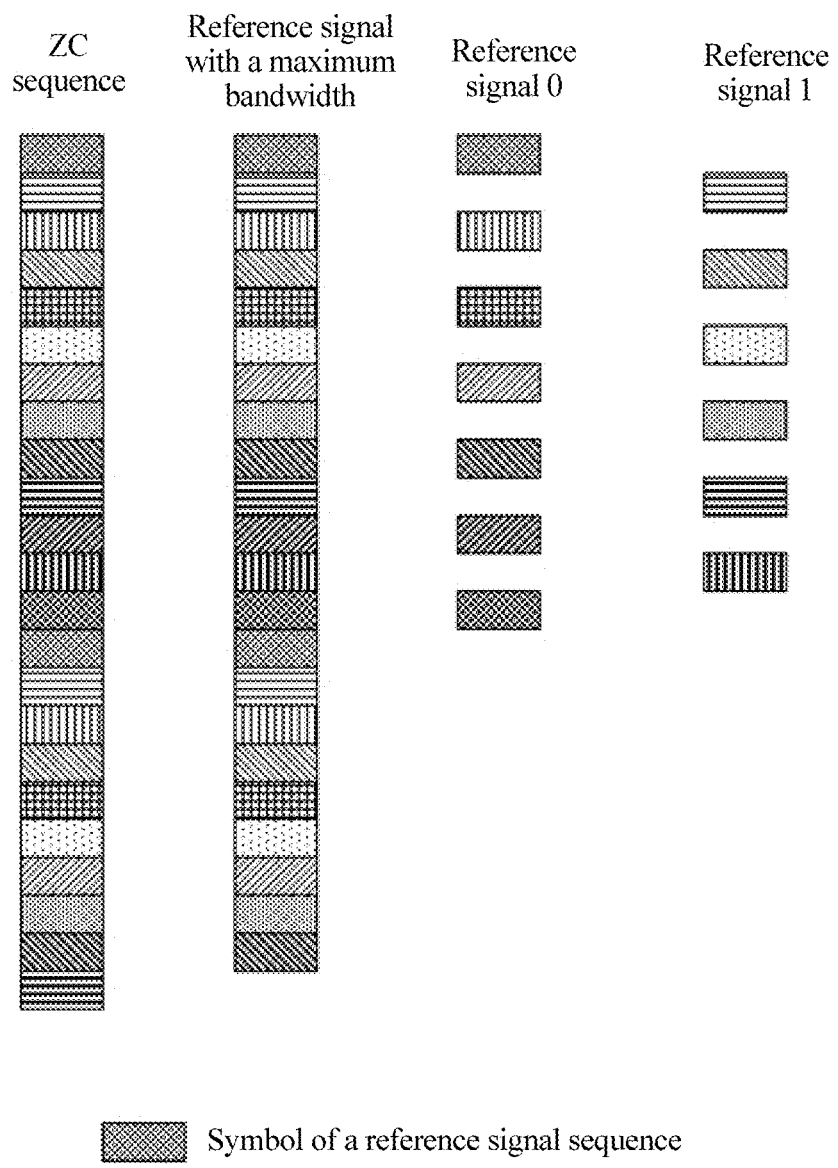
FIG. 5 is a schematic diagram of another reference signal sequence generation method according to an embodiment of this application.

This application is also applied to a case in which minimum time-frequency resource units included in the frequency domain resource group are distributed in a comb shape. In one embodiment shown in FIG. 5, minimum time-frequency resource units in a frequency domain resource group of a reference signal 0 are distributed in a comb shape, adjacent minimum time-frequency resource units are spaced at a regular spacing, and the spacing is $N_{space}$ minimum time-frequency resource units. Minimum time-frequency resource units in a frequency domain resource group of a reference signal 1 are also discretely mapped, and a size of the frequency domain resource group of the reference signal 0 and that of the frequency domain resource group of the reference signal 1 may be the same, or may be different. A reference signal sequence with a length of N is discretely mapped to a frequency domain resource group, to generate a frequency domain reference signal, and the reference signal sequence is determined based on a location of the frequency domain resource group in a maximum frequency domain resource that can be allocated and a spacing between two adjacent minimum time-frequency resource units in the frequency domain resource group. Specifically, a reference signal sequence $R_q(n)$ is obtained based on a sequence $R_q^{\%}(n)$ obtained through linear phase rotation, which may be represented by a formula (10):

$$R_q(n) = R_q^{\%}(n \cdot N_{space} + N_{ini}) \tag{10.}$$

With reference to the formula (8) and the formula (10), a method for generating, based on a ZC sequence $X_q(m)$, the reference signal sequence $R_q(n)$ discretely mapped to the frequency domain resource group may be shown in a formula (11):

$$R_q(n) = e^{j \cdot \alpha \cdot n} X_q((n \cdot N_{space} + N_{ini}) \bmod N) \tag{11.}$$

With reference to the formula (9) and the formula (10), a method for generating, based on a ZC sequence $X_q(m)$, the reference signal sequence $R_q(n)$ discretely mapped to the frequency domain resource group may be shown in a formula (12):

$$R_q(n)=e^{j\cdot\alpha\cdot n}X_q(n\cdot N_{space}+N_{ini}) \quad (12.), \text{ where}$$

$n\cdot N_{space}+N_{ini}<N_{zc}$.

Figure 5A:
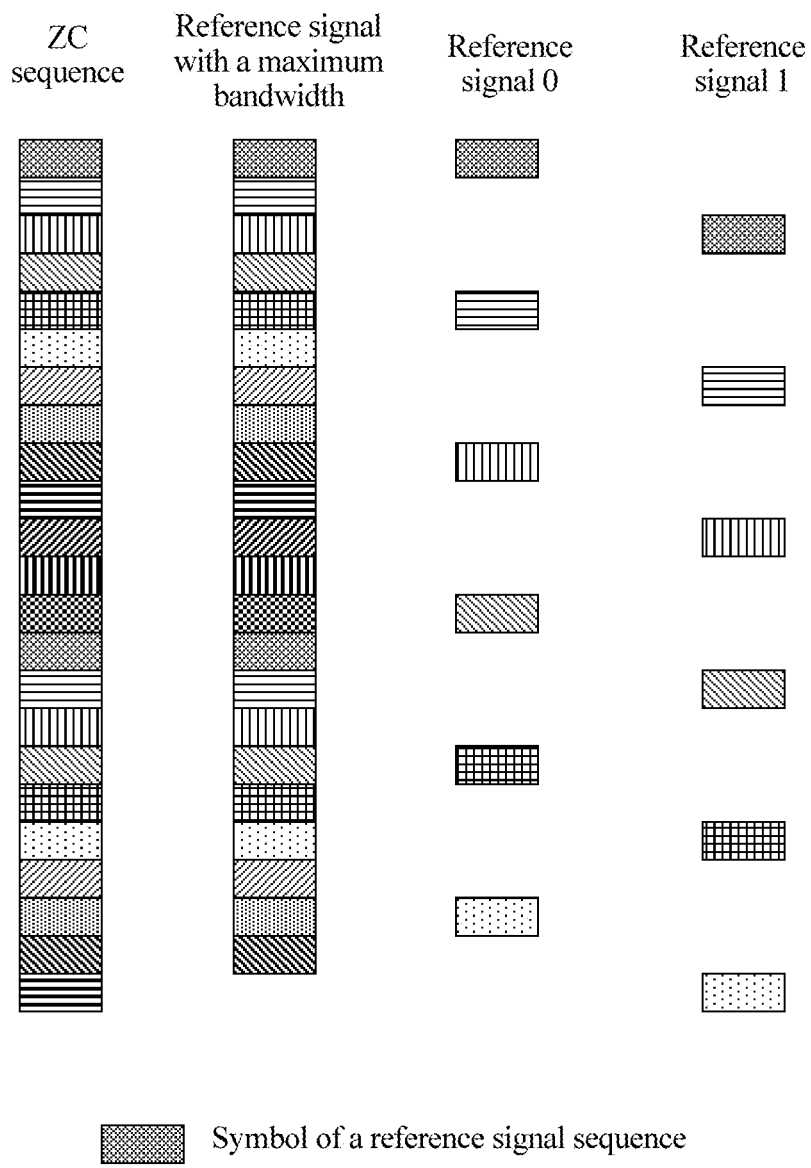
FIG. 5A is a schematic diagram of still another reference signal sequence generation method according to an embodiment of this application.

Optionally, a reference signal sequence with a length of N is discretely mapped to a frequency domain resource group, to generate a frequency domain reference signal, and the reference signal sequence is determined based on a location of the frequency domain resource group in a maximum frequency domain resource that can be allocated, and is unrelated to a spacing between two adjacent minimum time-frequency resource units in the frequency domain resource group. As shown in FIG. 5A, minimum time-frequency resource units in a frequency domain resource group corresponding to a reference signal 0 are distributed in a comb shape, adjacent minimum time-frequency resource units are spaced at a regular spacing, and the spacing is $N_{space}$ minimum time-frequency resource units. Minimum time-frequency resource units in a frequency domain resource group of a reference signal 1 are also distributed in a comb shape, and a size of the frequency domain resource group of the reference signal 0 and that of the frequency domain resource group of the reference signal 1 may be the same, or may be different. A reference signal sequence with a length of N is obtained by continuously capturing data with a length of N from the ZC sequence, and the captured data is only related to the length of the reference signal sequence. For example, the data starts to be captured from a head of the ZC sequence, or may start to be captured from a predefined offset location. This is not limited in this embodiment of this application. The following uses an example in which the data starts to be captured from the head of the ZC sequence. Specifically, a reference signal sequence $R_q(n)$ is obtained based on a sequence $R_q^{\%}(n)$ obtained through linear phase rotation, which may be represented by a formula (13):

$$R_q(n)=R_q^{\%}(n) \quad (13.).$$

With reference to the formula (5) and the formula (13), a method for generating, based on a ZC sequence $X_q(m)$, the reference signal sequence $R_q(n)$ discretely mapped to the frequency domain resource group may be shown in a formula (14):

$$R_q(n)=e^{j\cdot\alpha\cdot n}X_q(n \bmod N_{zc}) \quad (14.).$$

With reference to the formula (6) and the formula (13), a method for generating, based on a ZC sequence $X_q(m)$, the reference signal sequence $R_q(n)$ discretely mapped to the frequency domain resource group may be shown in a formula (15):

$$R_q(n)=e^{j\cdot\alpha\cdot n}X_q(n) \quad (15.).$$

Optionally, a reference signal sequence with a length of N is mapped to a frequency domain resource group, to generate a frequency domain reference signal. The reference signal sequence is determined based on a ZC sequence in a ZC sequence set, a length of the ZC sequence in the ZC sequence set is greater than a quantity of minimum time-frequency resource units included in a maximum frequency domain resource that can be allocated, and the ZC sequence set includes at least two ZC sequences with different lengths.

By using an LTE system with a 20 MHz system bandwidth as an example, the maximum frequency domain resource that can be allocated is 100 RBs. Considering that a bandwidth of a reference signal may be all possible assigned bandwidths ranging from three RBs to 100 RBs, under constraint conditions in which RCM<5.4, a maximum cross-correlation is less than 0.4, and 30 roots of the ZC sequence are required, a length $N_{zc}$ and a root value q of the ZC sequence that meet these constraint conditions are shown in Table 7.

TABLE 7

| | Sequence number | | | | | | | | | |
|---|---|---|---|---|---|---|---|---|---|---|
| | 0 | 1 | 2 | 3 | 4 | 5 | 6 | 7 | 8 | 9 |
| $N_{zc}$ | 1319 | 1319 | 1319 | 1319 | 1319 | 1319 | 1319 | 1319 | 1319 | 1321 |
| q | 26 | 75 | 123 | 256 | 639 | 679 | 979 | 1196 | 1293 | 50 |
| | Sequence number | | | | | | | | | |
| | 10 | 11 | 12 | 13 | 14 | 15 | 16 | 17 | 18 | 19 |
| $N_{zc}$ | 1321 | 1321 | 1321 | 1321 | 1321 | 1321 | 1321 | 1321 | 1321 | 1321 |
| q | 342 | 429 | 449 | 483 | 570 | 582 | 751 | 838 | 1072 | 1265 |
| | Sequence number | | | | | | | | | |
| | 20 | 21 | 22 | 23 | 24 | 25 | 26 | 27 | 28 | 29 |
| $N_{zc}$ | 1323 | 1325 | 1327 | 1327 | 1329 | 1331 | 1333 | 1333 | 1333 | 1333 |
| q | 1063 | 62 | 596 | 731 | 563 | 159 | 170 | 552 | 780 | 1104 |

The sequence number in Table 7 is merely a number example of a value combination of $N_{zc}$ and q, and no limitation is imposed on a sequence of value combinations of $N_{zc}$ and q. The sequence number includes another numbering form, for example, numbering may start from 0, or numbering may be performed in another sequence. For example, a sequence number corresponding to $N_{zc}$=1319 and q=75 in Table 7 is 1, and the sequence number may be 0, 30, or another value. Table 7 described above may include no sequence number.

As shown in FIG. 6, an embodiment of this application further provides a reference signal transmission method.

Block 610. A sending device converts a frequency domain reference signal from frequency domain to time domain, to generate a time domain reference signal, where the frequency domain reference signal includes a reference signal sequence mapped to a frequency domain resource group, the reference signal sequence is determined based on a ZC sequence and a length of the reference signal sequence, and a length value of the ZC sequence is greater than a quantity of minimum time-frequency resource units included in a maximum frequency domain resource that can be allocated. It may be understood that the length of the reference signal sequence is less than or equal to the quantity of minimum time-frequency resource units included in the maximum frequency domain resource that can be allocated, in other words, a bandwidth of the frequency domain resource group is less than or equal to the maximum frequency domain resource that can be allocated.

Further, the reference signal sequence is further determined based on a location of the frequency domain resource group in the maximum frequency domain resource that can be allocated.

Further, the reference signal sequence is further determined based on a spacing between two adjacent minimum time-frequency resource units in the frequency domain resource group.

Specifically, for a frequency domain reference signal generation method, refer to the method shown in FIG. 2.

A common method of conversion from frequency domain to time domain is inverse discrete Fourier transform (inverse discrete Fourier transform, IDFT) and inverse fast Fourier transformation (inverse fast Fourier transform, IFFT). However, this is not limited in this embodiment of this application.

Block 620. The sending device sends the time domain reference signal.

It may be understood that before sending the time domain reference signal, the sending device may further perform processing such as digital-to-analog conversion (converting a digital signal into an analog signal) and carrier modulation (modulating a baseband signal to a radio frequency carrier), and then transmit a signal by using an antenna.

As shown in FIG. 7, an embodiment of this application provides another reference signal transmission method.

Block 710. A receiving device receives a time domain reference signal.

It may be understood that the receiving device receives a radio signal from a radio channel by using an antenna, and the radio signal includes the time domain reference signal.

Block 729. The receiving device converts the time domain reference signal from time domain to frequency domain, to generate a frequency domain reference signal, where the frequency domain reference signal includes a reference signal sequence mapped to a frequency domain resource group, the reference signal sequence is determined based on a ZC sequence and a length of the reference signal sequence, and a length value of the ZC sequence is greater than a quantity of minimum time-frequency resource units included in a maximum frequency domain resource that can be allocated. It may be understood that the length of the reference signal sequence is less than or equal to the quantity of minimum time-frequency resource units included in the maximum frequency domain resource that can be allocated, in other words, a bandwidth of the frequency domain resource group is less than or equal to the maximum frequency domain resource that can be allocated.

Further, the reference signal sequence is further determined based on a location of the frequency domain resource group in the maximum frequency domain resource that can be allocated.

Further, the reference signal sequence is further determined based on a spacing between two adjacent minimum time-frequency resource units in the frequency domain resource group.

The receiving device measures the reference signal, to estimate a radio channel parameter between a sending device and the receiving device or to measure channel quality between a sending device and the receiving device, where a channel estimation result may be used to demodulate data sent by the sending device, and a channel quality measurement result may be used for link adaptation, resource allocation, and the like of data transmission between the sending device and the receiving device. A sequence measurement result may also be used for positioning measurement, and applications of the reference signal are not limited in this application.

In one embodiment, a method for obtaining a reference signal sequence by a sending device may be obtaining a generated reference signal sequence from a memory, or may be generating a reference signal sequence in real time based on a related parameter of the reference signal sequence.

A method for obtaining the related parameter of the reference signal sequence by the sending device may be obtaining the related parameter from the memory, or may be: a network device allocates the reference signal sequence and then sends the related parameter of the reference signal sequence to the sending device by using signaling, and the sending device obtains the reference signal sequence by using the related parameter of the reference signal sequence. A related parameter of the ZC sequence herein may include at least one of the length value of the ZC sequence, a root value of the ZC sequence, and a phase value of linear phase rotation. The network device herein may be a NodeB NodeB, an evolved NodeB eNodeB, a base station in a 5G communications system, or another network device.

To measure the foregoing received reference signal, with reference to the frequency domain reference signal generation process in FIG. 2, the receiving device may generate a frequency domain reference signal that is the same as the frequency domain reference signal generated by the sending device. Specifically, a method for obtaining a reference signal sequence by the receiving device may be first obtaining a related parameter of the reference signal sequence, and then generating the reference signal sequence by using the parameter. A method for obtaining the related parameter of the reference signal sequence by the receiving device may be: a sending device sends the related parameter of the reference signal sequence to the receiving device by using signaling after obtaining the related parameter of the reference signal sequence, or may be: a network device sends the related parameter of the reference signal sequence to the receiving device by using signaling.

The sending device and the receiving device may further obtain the related parameter of the reference signal sequence in an implicit manner, for example, implicitly determine the related parameter of the reference signal sequence by using a cell identifier, a slot number, and the like.

In the foregoing embodiments of this application, the solutions such as the reference signal sequence generation method and the reference signal transmission method provided in the embodiments of this application are separately described from perspectives of the sending device, the receiving device, and interaction between the sending device and the receiving device. It may be understood that to implement the foregoing functions, each device such as the sending device or the receiving device includes a corresponding hardware structure and/or software module for performing each function. A person skilled in the art should be easily aware that in combination with the examples described in the embodiments disclosed in this specification, units and method steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 9:
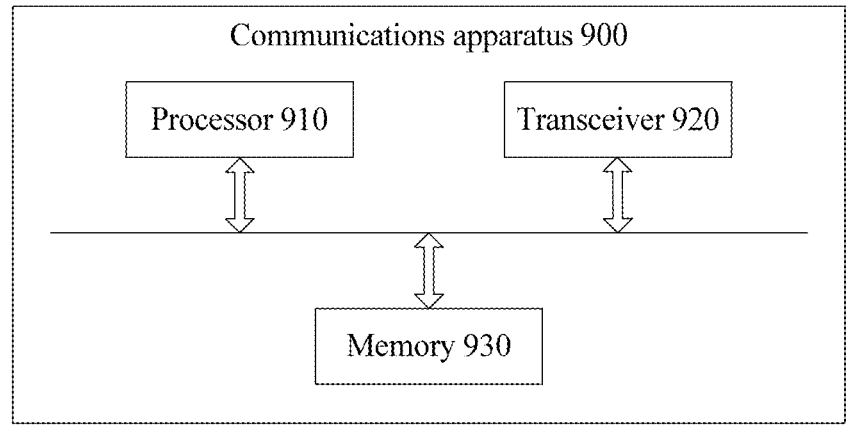
FIG. 9 is a schematic structural diagram of another communications apparatus according to an embodiment of this application.

FIG. 8 and FIG. 9 are schematic structural diagrams of two possible communications apparatuses according to embodiments of this application. The communications apparatus implements functions of a sending device in the foregoing reference signal transmission method embodiment, and therefore can also achieve beneficial effects of the foregoing reference signal transmission method. In this embodiment of this application, the communications apparatus may be the UE 130, the UE 140, or the base station 120 shown in FIG. 1, or may be another transmit-side device that performs wireless communications by using a reference signal.

As shown in FIG. 8, a communications apparatus 800 includes a processing unit 810 and a sending unit 820.

The processing unit 810 is configured to convert a frequency domain reference signal from frequency domain to time domain, to generate a time domain reference signal. The frequency domain reference signal includes a reference signal sequence mapped to a frequency domain resource group, the reference signal sequence is determined based on a ZC sequence and a length of the reference signal sequence, and a length value of the ZC sequence is greater than a quantity of minimum time-frequency resource units included in a maximum frequency domain resource that can be allocated.

The sending unit 820 is configured to send the time domain reference signal.

As shown in FIG. 9, a communications apparatus 900 includes a processor 910, a transceiver 920, and a memory 930, and the memory 930 may be configured to store code executed by the processor 910. The components in the communications apparatus 900 communicate with each other by using an internal connection path, for example, transmit a control and/or data signal by using a bus.

The processor 910 is configured to convert a frequency domain reference signal from frequency domain to time domain, to generate a time domain reference signal. The frequency domain reference signal includes a reference signal sequence mapped to a frequency domain resource group, the reference signal sequence is determined based on a ZC sequence and a length of the reference signal sequence, and a length value of the ZC sequence is greater than a quantity of minimum time-frequency resource units included in a maximum frequency domain resource that can be allocated.

The transceiver 920 is configured to send the time domain reference signal.

For more detailed function descriptions of the processing unit 810, the processor 910, the sending unit 820, and the transceiver 920 described above, refer to the foregoing method embodiments. Details are not described herein again.

Figure 10:
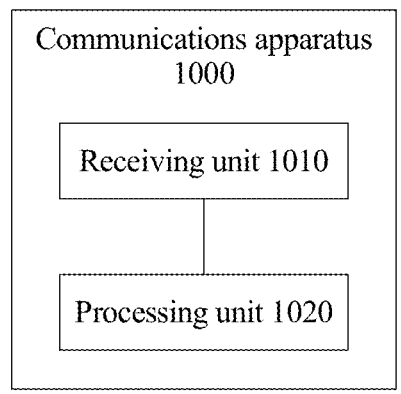
FIG. 10 is a schematic structural diagram of another communications apparatus according to an embodiment of this application.
Figure 11:
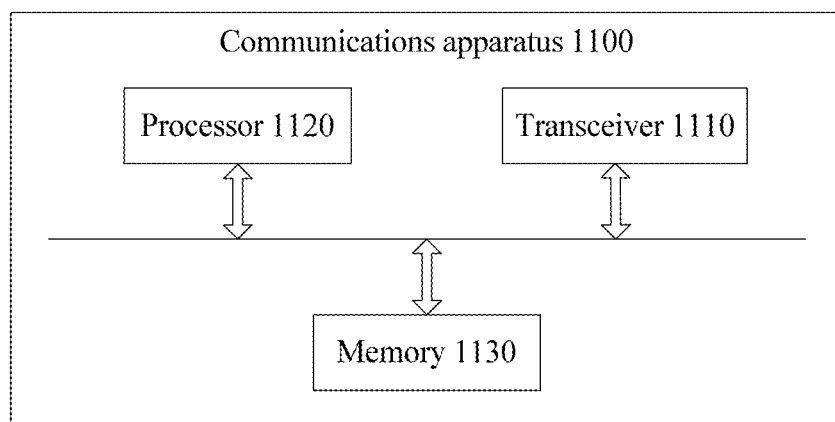
FIG. 11 is a schematic structural diagram of another communications apparatus according to an embodiment of this application.

FIG. 10 and FIG. 11 are schematic structural diagrams of other two possible communications apparatuses according to embodiments of this application. The communications apparatus implements functions of a receiving device in the foregoing reference signal transmission method embodiment, and therefore can also achieve beneficial effects of the foregoing reference signal transmission method. In this embodiment of this application, the communications apparatus may be the UE 130, the UE 140, or the base station 120 shown in FIG. 1, or may be another receive-side device that performs wireless communications by using a reference signal.

As shown in FIG. 10, a communications apparatus 1000 includes a receiving unit 1010 and a processing unit 1020.

The receiving unit 1010 is configured to receive a time domain reference signal.

The processing unit 1020 is configured to convert the time domain reference signal from time domain to frequency domain, to generate a frequency domain reference signal. The frequency domain reference signal includes a reference signal sequence mapped to a frequency domain resource group, the reference signal sequence is determined based on a ZC sequence and a length of the reference signal sequence, and a length value of the ZC sequence is greater than a quantity of minimum time-frequency resource units included in a maximum frequency domain resource that can be allocated.

As shown in FIG. 11, a communications apparatus 1100 includes a processor 1120, a transceiver 1110, and a memory 1130, and the memory 1130 may be configured to store code executed by the processor 1120. The components in the communications apparatus 1100 communicate with each other by using an internal connection path, for example, transmit a control and/or data signal by using a bus.

The transceiver 1110 is configured to receive a time domain reference signal.

The processor 1120 is configured to convert the time domain reference signal from time domain to frequency domain, to generate a frequency domain reference signal. The frequency domain reference signal includes a reference signal sequence mapped to a frequency domain resource group, the reference signal sequence is determined based on a ZC sequence and a length of the reference signal sequence, and a length value of the ZC sequence is greater than a quantity of minimum time-frequency resource units included in a maximum frequency domain resource that can be allocated.

It may be understood that FIG. 9 and FIG. 11 each merely show one design of the communications apparatus. In actual application, the communications apparatus may include any quantity of receivers and processors, and all communications apparatuses that can implement the embodiments of this application fall within the protection scope of this application.

For more detailed function descriptions of the receiving unit 1010, the transceiver 1110, the processing unit 1020, and the processor 1120 described above, refer to the foregoing method embodiments. Details are not described herein again.

It should be noted that the processor in the embodiments of this application may be a central processing unit (Central Processing Unit, CPU), may be another general purpose processor, a digital signal processor (Digital Signal Processor, DSP), an application-specific integrated circuit (Application-Specific Integrated Circuit, ASIC), a field programmable gate array (Field-Programmable Gate Array, FPGA) or another programmable logical device, a transistor logical device, a hardware component, or a combination thereof. The general purpose processor may be a microprocessor, or may be any common processor.

The method steps in the embodiments of this application may be implemented in a hardware manner or may be implemented in a manner of executing a software instruction by a processor. The software instruction may include a corresponding software module. The software module may be stored in a random access memory (Random Access Memory, RAM), a flash memory, a read-only memory (Read-Only Memory, ROM), a programmable read-only memory (Programmable ROM, PROM), an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a sending device or a receiving device. Certainly, the processor and the storage medium may exist in a sending device or a receiving device as discrete components.

All or some of the foregoing embodiments may be implemented through software, hardware, firmware, or any combination thereof. When being implemented by software, all or some of the embodiments may be implemented in a form of a computer program product. The computer program product includes one or more computer instructions. When the computer program instruction is loaded and executed on the computer, all or some of the procedures or functions in the embodiments of this application are generated. The computer may be a general-purpose computer, a dedicated computer, a computer network, or another programmable apparatus. The computer instruction may be stored in a computer readable storage medium, or may be transmitted by using the computer readable storage medium. The computer instruction may be transmitted from a website, computer, server, or data center to another website, computer, server, or data center in a wired manner (for example, by using a coaxial cable, an optical fiber, or a digital subscriber line (DSL)) or in a wireless (for example, infrared, radio, and microwave, or the like) manner. The computer readable storage medium may be any available medium that can be accessed by a computer, or a data storage device such as a server or a data center that integrates one or more available media. The available medium may be a magnetic medium (for example, a floppy disk, a hard disk, or a magnetic tape), an optical medium (for example, a DVD), a semiconductor medium (for example, a solid state disk Solid State Disk (SSD)), or the like.

It may be understood that numerical symbols involved in the embodiments of this application are differentiated merely for ease of description, but are not used to limit the scope of the embodiments of this application.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

The foregoing descriptions are embodiments of this application. Any variation or replacement readily figured out by a person skilled in the art within the technical scope disclosed in this application shall fall within the protection scope in the embodiments of this application.

What is claimed is:

1. A reference signal transmission method, wherein the method comprises:
converting a frequency domain reference signal from frequency domain to time domain, to generate a time domain reference signal, wherein the frequency domain reference signal comprises a reference signal sequence mapped to a frequency domain resource group, the reference signal sequence is determined based on a Zadoff-Chu sequence having a length value greater than a quantity of subcarriers included in a maximum frequency domain resource that can be allocated and a length of the reference signal sequence, wherein the reference signal sequence is further determined based on a location of the frequency domain resource group in the maximum frequency domain resource that can be allocated, and a bandwidth of the frequency domain resource group is less than or equal to the maximum frequency domain resource that can be allocated; and
sending the time domain reference signal.

2. The method according to claim 1, wherein the reference signal sequence is further determined based on a spacing between two adjacent subcarriers in the frequency domain resource group.

3. The method according to claim 2, wherein the Zadoff-Chu sequence is $X_q(m)$, and $X_q(m)$ is determined according to $$X_q(m) = e^{-j\frac{\pi \cdot q \cdot m \cdot (m+1)}{N_{zc}}},$$

wherein
j represents an imaginary unit, m represents a sequence number of an element in the Zadoff-Chu sequence, m is an integer and $0 \leq m \leq N_{zc}-1$, $N_{zc}$ represents the length value of the Zadoff-Chu sequence, q represents a root value of the ZC sequence, and q and $N_{zc}$ are mutually prime.

4. A reference signal transmission method, comprising:
receiving a time domain reference signal; and
converting the time domain reference signal from time domain to frequency domain, to generate a frequency domain reference signal, wherein the frequency domain reference signal comprises a reference signal sequence mapped to a frequency domain resource group, the reference signal sequence is determined based on a Zadoff-Chu sequence having a length value greater than a quantity of subcarriers included in a maximum frequency domain resource that can be allocated and a length of the reference signal sequence, and wherein the reference signal sequence is further determined based on a location of the frequency domain resource group in the maximum frequency domain resource that can be allocated.

5. The method according to claim 4, wherein the reference signal sequence is further determined based on a spacing between two adjacent subcarriers in the frequency domain resource group.

6. The method according to claim 5, wherein the Zadoff-Chu sequence is $X_q(m)$, and $X_q(m)$ is determined according to $$X_q(m) = e^{-j\frac{\pi \cdot q \cdot m \cdot (m+1)}{N_{zc}}},$$

wherein j represents an imaginary unit, m represents a sequence number of an element in the Zadoff-Chu sequence, m is an integer and $0 \le m \le N_{zc}-1$, $N_{zc}$ represents the length value of the Zadoff-Chu sequence, q represents a root value of the ZC sequence, and q and $N_{zc}$ are mutually prime.

7. The method according to claim 6, wherein the length $N_{zc}$ of the Zadoff-Chu sequence is 21157, and the root value q of the Zadoff-Chu sequence is one of the following: 1149, 1203, 1215, 1345, 1827, 1873, 1962, 2040, 2276, 2927, 2931, 3196, 3201, 3223, 3406, 3787, 5596, 6247, 6276, 6426, 7736, 7749, 7768, 8693, 8767, 8779, 8970, 9216, 9983, 9996, 11161, 11174, 11941, 12187, 12378, 12390, 12464, 13389, 13408, 13421, 14731, 14881, 14910, 15561, 17370, 17751, 17934, 17956, 17961, 18226, 18230, 18881, 19117, 19195, 19284, 19330, 19812, 19942, 19954, and 20008.

8. The method according to claim 6, wherein the length $N_{zc}$ of the Zadoff-Chu sequence is 131969, and the root value q of the Zadoff-Chu sequence is one of the following: 2908, 5919, 8108, 9176, 11359, 12842, 13721, 18287, 19123, 21435, 22441, 25895, 27039, 30666, 36263, 38169, 40822, 42738, 44949, 51705, 54664, 59740, 61399, 67366, 68376, 70570, 78403, 82997, 86400, and 95108.

9. The method according to claim 8, wherein a bandwidth of the frequency domain resource group is greater than or equal to three resource blocks (RBs).

10. The method according to claim 6, wherein the length $N_{zc}$ of the Zadoff-Chu sequence is 479971, and the root value q of the Zadoff-Chu sequence is one of the following: 24335, 35852, 49443, 65019, 76272, 88558, 102028, 126841, 139505, 150710, 169872, 181751, 197023, 210577, 222328, 253191, 264402, 276530, 296245, 307534, 329261, 340466, 352513, 368238, 387393, 402362, 413569, 424829, 437224, and 448552.

11. A communications apparatus, comprising:
a receiver, configured to receive a time domain reference signal; and
a processor, configured to convert the time domain reference signal from time domain to frequency domain, to generate a frequency domain reference signal, wherein the frequency domain reference signal comprises a reference signal sequence mapped to a frequency domain resource group, the reference signal sequence is determined based on a Zadoff-Chu sequence having a length value greater than a quantity of subcarriers included in a maximum frequency domain resource that can be allocated and a length of the reference signal sequence, and wherein the reference signal sequence is further dtermined based on a location of the frequency domain resource group in the maximum frequency domain resource that can be allocated.

12. The communications apparatus according to claim 11, wherein the reference signal sequence is further determined based on a spacing between two adjacent subcarriers in the frequency domain resource group.

13. The communications apparatus according to claim 12, wherein the Zadoff-Chu sequence is $X_q(m)$, and $X_q(m)$ is determined according to $$X_q(m) = e^{-j\frac{\pi \cdot q \cdot m \cdot (m+1)}{N_{zc}}},$$

wherein j represents an imaginary unit, m represents a sequence number of an element in the Zadoff-Chu sequence, m is an integer and $0 \le m \le N_{zc}-1$, $N_{zc}$ represents the length value of the Zadoff-Chu sequence, q represents a root value of the ZC sequence, and q and $N_{zc}$ are mutually prime.

14. The communications apparatus according to claim 13, wherein the length $N_{zc}$ of the Zadoff-Chu sequence is 21157, and the root value q of the Zadoff-Chu sequence is one of the following: 1149, 1203, 1215, 1345, 1827, 1873, 1962, 2040, 2276, 2927, 2931, 3196, 3201, 3223, 3406, 3787, 5596, 6247, 6276, 6426, 7736, 7749, 7768, 8693, 8767, 8779, 8970, 9216, 9983, 9996, 11161, 11174, 11941, 12187, 12378, 12390, 12464, 13389, 13408, 13421, 14731, 14881, 14910, 15561, 17370, 17751, 17934, 17956, 17961, 18226, 18230, 18881, 19117, 19195, 19284, 19330, 19812, 19942, 19954, and 20008.

15. The communications apparatus according to claim 13, wherein the length $N_{zc}$ of the Zadoff-Chu sequence is 131969, and the root value q of the Zadoff-Chu sequence is one of the following: 2908, 5919, 8108, 9176, 11359, 12842, 13721, 18287, 19123, 21435, 22441, 25895, 27039, 30666, 36263, 38169, 40822, 42738, 44949, 51705, 54664, 59740, 61399, 67366, 68376, 70570, 78403, 82997, 86400, and 95108.

16. The communications apparatus according to claim 15, wherein a bandwidth of the frequency domain resource group is greater than or equal to three resource blocks (RBs).

17. The communications apparatus according to claim 13, wherein the length $N_{zc}$ of the Zadoff-Chu sequence is 479971, and the root value q of the Zadoff-Chu sequence is one of the following: 24335, 35852, 49443, 65019, 76272, 88558, 102028, 126841, 139505, 150710, 169872, 181751, 197023, 210577, 222328, 253191, 264402, 276530, 296245, 307534, 329261, 340466, 352513, 368238, 387393, 402362, 413569, 424829, 437224, and 448552.

* * * * *